(12) United States Patent
Saeki et al.

(10) Patent No.: US 6,357,916 B2
(45) Date of Patent: Mar. 19, 2002

(54) HYDRODYNAMIC BEARING DEVICE

(75) Inventors: Yasuo Saeki, Tottori-ken; Takao Yoshitsugu, Yonago; Katsunori Sakuragi, Yonago; Hideshi Fukutani, Yonago, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/245,308

(22) Filed: Feb. 5, 1999

(30) Foreign Application Priority Data

Feb. 9, 1998 (JP) .............................. 10-026275

(51) Int. Cl.[7] .............................. H02K 5/16; G11B 5/52; F16C 32/06
(52) U.S. Cl. .................. 384/100; 384/107; 384/112; 384/123; 310/90
(58) Field of Search ............................ 384/100, 107, 384/112, 121, 123; 310/90, 156

(56) References Cited

U.S. PATENT DOCUMENTS 5,433,529 A * 7/1995 Hensel .................. 384/112
5,504,637 A    4/1996 Asada et al.
5,516,212 A * 5/1996 Titcomb ................. 384/112
5,559,382 A * 9/1996 Oku et al. .............. 384/112
5,658,080 A * 8/1997 Ichiyama ................ 384/112

FOREIGN PATENT DOCUMENTS

| JP | 8-70555 | * 3/1996 |
| JP | 8-161822 | * 6/1996 |
| JP | 8-163821 | * 6/1996 |
| JP | 8-172750 | 7/1996 |

* cited by examiner

Primary Examiner—David A. Bucci
Assistant Examiner—William C Joyce
(74) Attorney, Agent, or Firm—Parkhurst & Wendel, L.L.P.

(57) ABSTRACT

A hydrodynamic bearing which prevents a lubricating fluid from scattering out of the dynamic pressure generating portion. The bearing includes radial spacing d of a gap at an open end of the thrust-side dynamic pressure generating portion, whose value is greater than a spacing of the thrust-side dynamic pressure generating portion, as measured relative to the thrust direction. Scattering of lubricating fluid from the open end of the thrust-side dynamic pressure generating portion is therefore prevented even when the bearing rotates at a high speed in a high temperature envivronent.

5 Claims, 6 Drawing Sheets

HYDRODYNAMIC BEARING DEVICE

FIELD OF THE INVENTION

The present invention relates to a hydrodynamic bearing device for use in an office automation system and an audio-visual system.

BACKGROUND OF THE INVENTION

Hydrodynamic bearing devices are generally used in rotary head cylinders for tabletop VTRs and camera-incorporated VTRs, in polygon scanner motors for laser copiers, and in recording medium rotation drivers for floppy disk devices and hard disk devices.

Specifically, the hard disk devices have higher memory capacities and higher data transfer speeds. This requires a disk rotating device for use in a recording apparatus of this type to be capable of high-speed and high-precision rotation.

To this end, a hydrodynamic bearing device as disclosed in U.S. Pat. No. 5,504,637 is used for a rotary main shaft of the recording apparatus.

The hydrodynamic bearing device has a construction as shown in FIG. 5.

The hydrodynamic bearing device includes a stationary shaft 1 and a rotary sleeve 2 supported around the stationary shaft 1. The stationary shaft 1 has a proximal end fixed to a lower casing 3. Hard disks 4 are fitted around the rotary sleeve 2.

Dynamic pressure generating grooves 6 are provided in an outer circumferential portion of the stationary shaft 1 in a radial-side dynamic pressure generating portion 5 defined between the stationary shaft 1 and the rotary sleeve 2.

A stationary thrust ring 9 is attached to a distal end of the stationary shaft 1 by an extension shaft 8 formed with a male thread portion 7 threaded with the stationary shaft 1.

The rotary sleeve 2 has a recessed portion 10 provided in association with the stationary thrust ring 9. An opening of the recessed portion 10 is virtually closed by a rotary thrust ring 12 which has at its center a center hole 11 of a diameter greater than the outer diameter of the extension shaft 8. The rotary thrust ring 12 is fixed to the rotary sleeve 2 by a screw 13.

In a thrust-side dynamic pressure generating portion 14 defined by the recessed portion 10 of the rotary sleeve 2, the stationary thrust ring 9 and the rotary thrust ring 12, dynamic pressure generating grooves 15, 16 are provided in upper and lower faces of the stationary thrust ring 9. The thrust-side dynamic pressure generating portion 14 and the radial-side dynamic pressure generating portion 5 are filled with a lubricating fluid.

A stator winding 17 is disposed around a proximal end portion of the stationary shaft 1 on the lower casing 3. A magnet 18 is provided on an inner circumferential surface of the rotary sleeve 2 as opposing to the stator winding 17. The extension shaft 8 is fixed to an upper casing 19 by a screw 20.

In the hydrodynamic bearing device having the aforesaid construction, the hard disks 4 are rotated at a high speed via the rotary sleeve 2 in a sealed space defined between the lower casing 3 and the upper casing 19 upon energization of the stator winding 17.

The rotation of the rotary sleeve 2 about the stationary shaft 1 pumps the lubricating fluid so that the rotary sleeve 2 can maintain non-contact rotation.

DISCLOSURE OF THE INVENTION

However, the aforesaid arrangement has the following drawback.

Due to expansion of the lubricating fluid and a centrifugal force, the lubricating fluid 21 is liable to scatter out of the radial-side dynamic pressure generating portion 5 as indicated by 22 in FIG. 6, or scatter out of a gap between the extension shaft 8 and the rotary thrust ring 12 as indicated by 23, thereby causing lockup or seizure of a motor.

Particularly, where the scattered lubricating fluid adheres onto the hard disks 4, erroneous data reproduction may result.

More specifically, a conventional technical approach to the prevention of the scattering of the lubricating fluid from the open end of the thrust-side dynamic pressure generating portion is to reduce the radial spacing of the gap as much as possible.

Further, improvement in shock resistance with respect to the thrust direction is currently demanded. This demand is directed not only to a hydrodynamic bearing device constructed such that a stationary shaft is fixed at its opposite ends as described above, but also to a hydrodynamic bearing device constructed such that the stationary shaft is fixed only at its proximal end.

It is therefore an object of the present invention to provide a hydrodynamic bearing device which has an improved construction to prevent a lubricating fluid from scattering out of a dynamic pressure generating portion.

The hydrodynamic bearing device of the present invention is characterized in that a radial spacing of a gap at an open end of a thrust-side dynamic pressure generating portion is set greater than a spacing of the thrust-side dynamic pressure generating portion as measured with respect to the thrust direction.

With this arrangement, the scattering of the lubricating fluid from the open end of the thrust-side dynamic pressure generating portion can be prevented even when the hydrodynamic bearing device is operated at a high rotation speed in a high temperature environment.

In accordance with a first aspect of the present invention, there is provided a hydrodynamic bearing device which comprises a stationary shaft having opposite ends at least one of which is fixed and a rotary sleeve supported rotatably about the stationary shaft and is adapted to pump a lubricating fluid between the stationary shaft and the rotary sleeve for non-contact rotation of the device, wherein the stationary shaft is provided with a stationary thrust ring, wherein the rotary sleeve has a recessed portion defined by faces thereof opposed to upper and lower faces and outer circumferential surface of the stationary thrust ring, wherein the lubricating fluid is filled in a gap defined between the stationary thrust ring and the recessed portion, wherein the following expression is satisfied:

$$\Delta L = t + 10\ \mu m\ \text{to}\ 30\ \mu m\ [10\ \mu m \leq \Delta L - t \leq 30\ \mu m]$$

wherein t is a thickness of the stationary thrust ring and $\Delta L$ is a height of the recessed portion.

In accordance with a second aspect of the present invention, the hydrodynamic bearing device is characterized in that the stationary shaft is supported at its fixed opposite ends, that a radial-side dynamic pressure generating portion is defined between the stationary shaft and the rotary sleeve and a thrust-side dynamic pressure generating portion is defined between the stationary thrust ring and the recessed portion and disposed on one side of the radial-side dynamic pressure generating portion, that the radial-side dynamic pressure generating portion and the thrust-side dynamic pressure generating portion are filled with the lubricating fluid, and that a radial spacing Δd of a gap at an open end of the thrust-side dynamic pressure generating portion satisfies the following expression:

$$\Delta d > \Delta L - t$$

In accordance with a third aspect of the present invention, there is provided a hydrodynamic bearing device which comprises a stationary shaft supported at its fixed opposite ends and a rotary sleeve supported rotatably about the stationary shaft and is adapted to pump a lubricating fluid between the stationary shaft and the rotary sleeve for non-contact rotation of the device, wherein the stationary shaft is provided with a stationary thrust ring, wherein the rotary sleeve has a recessed portion defined by faces thereof opposed to upper and lower faces and outer circumferential surface of the stationary thrust ring, wherein a radial-side dynamic pressure generating portion is defined between the stationary shaft and the rotary sleeve and a thrust-side dynamic pressure generating portion is defined between the stationary thrust ring and the recessed portion and disposed on one side of the radial-side dynamic pressure generating portion, wherein the radial-side dynamic pressure generating portion and the thrust-side dynamic pressure generating portion are filled with the lubricating fluid, wherein a radial spacing Δd of a gap at an open end of the thrust-side dynamic pressure generating portion satisfies the following expression:

$$\Delta d > \Delta L - t$$

wherein t is a thickness of the stationary thrust ring and ΔL is a height of the recessed portion.

In accordance with a fourth aspect of the present invention, the hydrodynamic bearing device comprises: a stationary shaft having a proximal end fixed to a casing; a rotary sleeve supported rotatably about the stationary shaft and having an open portion provided adjacent one end thereof in association with a distal end of the stationary shaft, the opening having a diameter greater than a diameter of the stationary shaft, the rotary sleeve having an outer circumference to which a load member is attached; a stationary thrust ring of a disk shape having a through-hole at its center and attached to the distal end of the stationary shaft, the stationary thrust ring having a lower face opposed to a bottom of the open portion of the rotary sleeve and an outer circumferential surface opposed to an inner circumferential surface of the open portion; an extension shaft having a proximal end threaded with the distal end of the stationary shaft thereby fixing the stationary thrust ring to the stationary shaft; and a rotary thrust ring of a disk shape fitted in the open portion of the rotary sleeve and having at its center a through-hole through which the extension shaft extends, wherein a dynamic pressure generating groove is provided in a radial-side dynamic pressure generating portion defined by an outer circumferential portion of the stationary shaft and an inner circumferential portion of a center hole formed in the rotary sleeve, wherein dynamic pressure generating grooves are provided in a thrust-side dynamic pressure generating portion defined by the stationary thrust ring, the inner circumferential surface of the open portion of the rotary sleeve and faces of the rotary sleeve opposed to the stationary thrust ring, wherein the radial-side dynamic pressure generating portion and the thrust-side dynamic pressure generating portion are filled with the lubricating fluid, wherein a distal end of the extension shaft is fixed to the casing.

In accordance with a fifth aspect of the present invention, the hydrodynamic bearing device according is characterized in that Δd is 10 μm to 30 μm.

DESCRIPTION OF THE EMBODIMENT

An embodiment of the present invention will hereinafter be described with reference to FIGS. 1 to 4.

Figure 1:
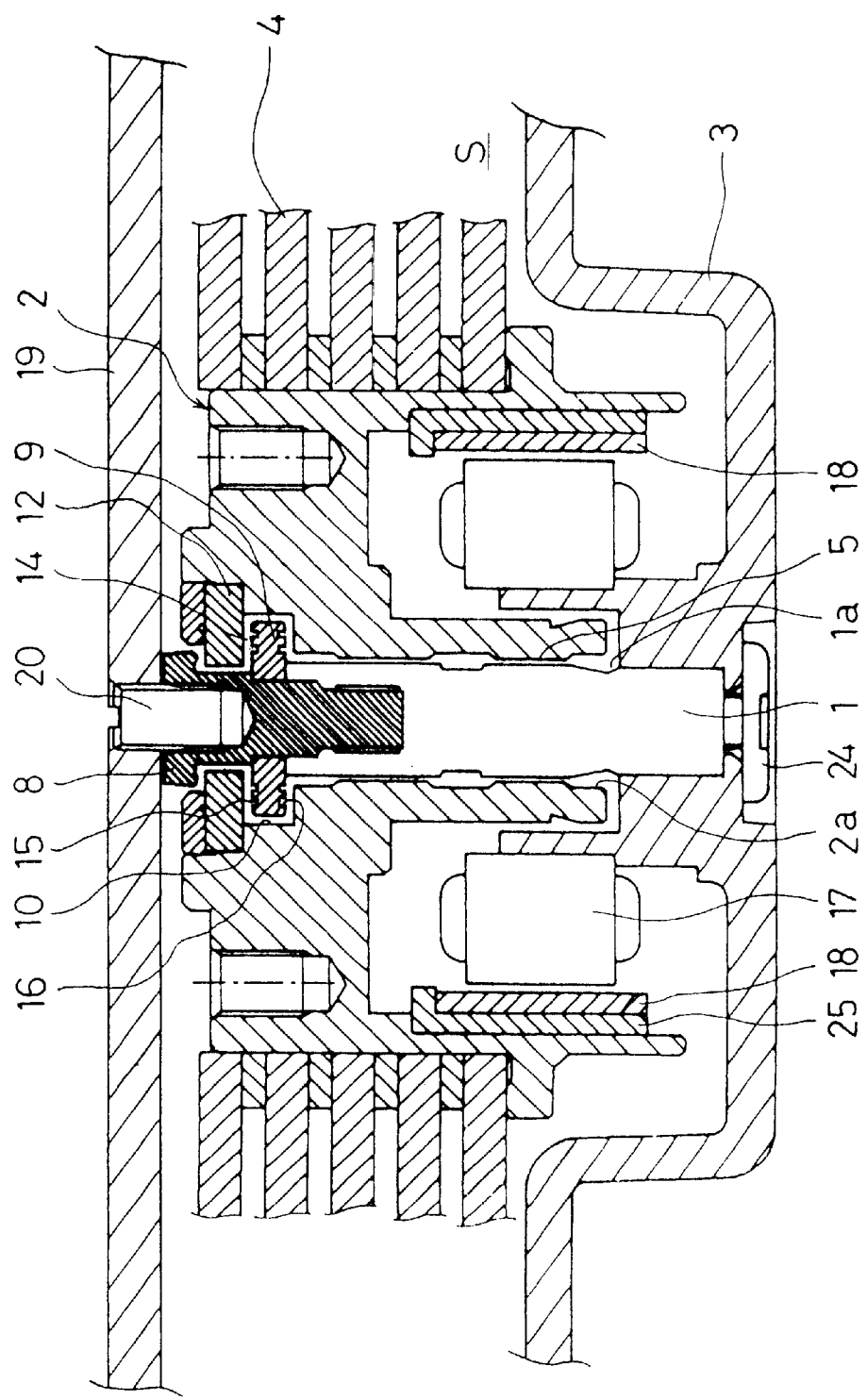
FIG. 1 is a sectional view illustrating a hydrodynamic bearing device according to one embodiment of the present invention.

FIG. 1 shows a hydrodynamic bearing device for use in a hard disk device.

This hydrodynamic bearing device is illustrated as having a construction such that a stationary shaft is supported at its opposite ends, but the stationary shaft may be cantilevered.

Figure 5:
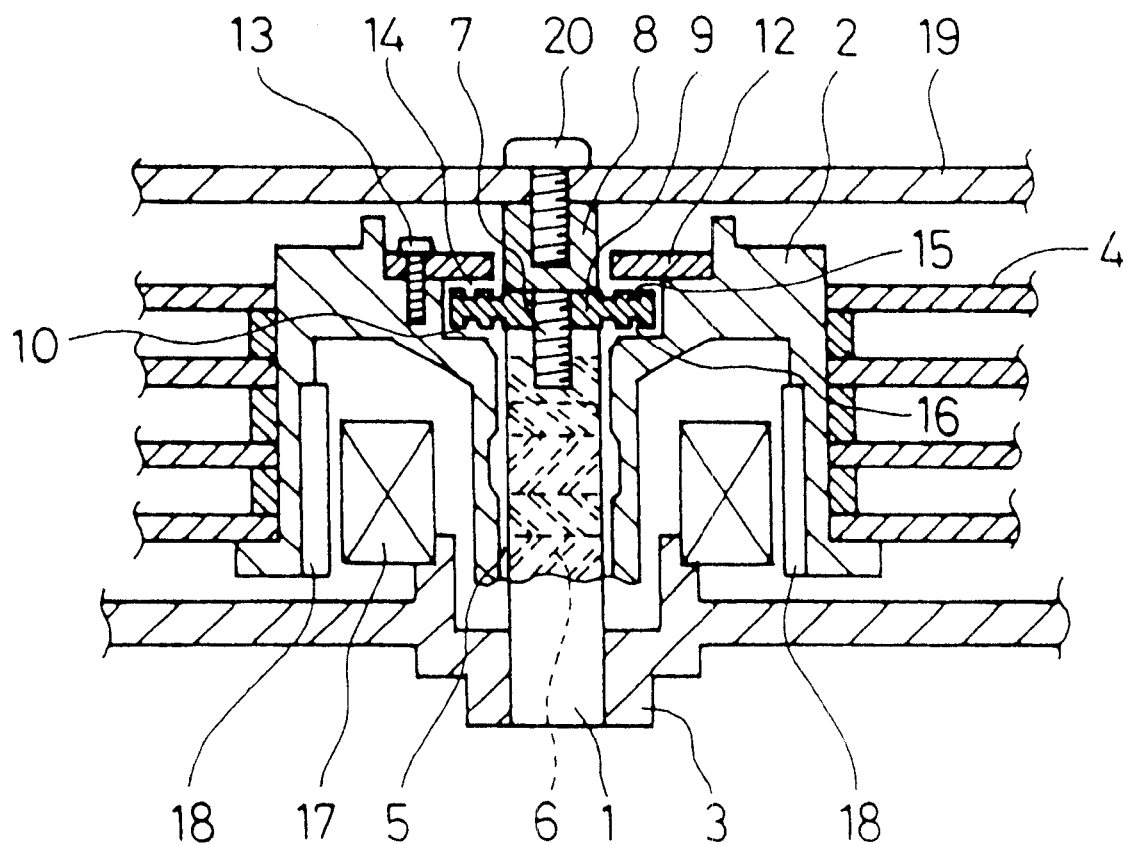
FIG. 5 is a sectional view of a conventional hydrodynamic bearing device.
Figure 6:
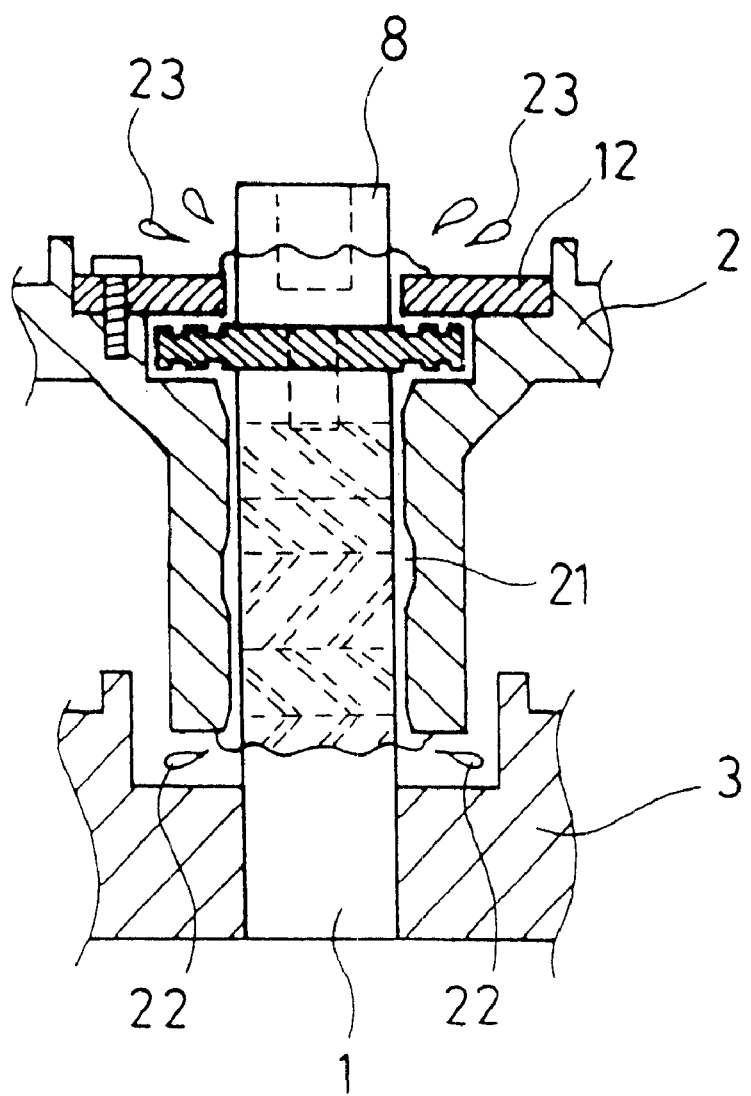
FIG. 6 is an enlarged view illustrating major portions of the hydrodynamic bearing device of FIG. 5.

The hydrodynamic bearing device shown in FIG. 1 has substantially the same construction as the conventional one shown in FIG. 5 with some specific portions thereof being different. In these figures, components having like functions are denoted by like reference characters.

Referring to FIG. 1, a proximal end of the stationary shaft 1 is fixed to a lower casing 3 by a screw 24. A stationary thrust ring 9 is fixed to a distal end of the stationary shaft 1 by an extension shaft 8.

The rotary sleeve 2 has a recessed portion 10 which is defined by faces thereof opposed to lower and upper faces and outer circumferential surface of the stationary thrust ring 9. A radial-side dynamic pressure generating portion 5 is defined between the stationary shaft 1 and the rotary sleeve 2, and a thrust-side dynamic pressure generating portion 14 is defined between the stationary thrust ring 9 and the recessed portion 10 and provided on one side of the radial-side dynamic pressure generating portion 5. Dynamic pressure generating grooves 6 are provided on an outer circumferential portion of the stationary shaft 1 in the radial-side dynamic pressure generating portion 5. Dynamic pressure generating grooves 15 and 16 are provided in upper and lower faces, respectively, of the stationary thrust ring 9 in the thrust-side dynamic pressure generating portion 14.

Figure 2:
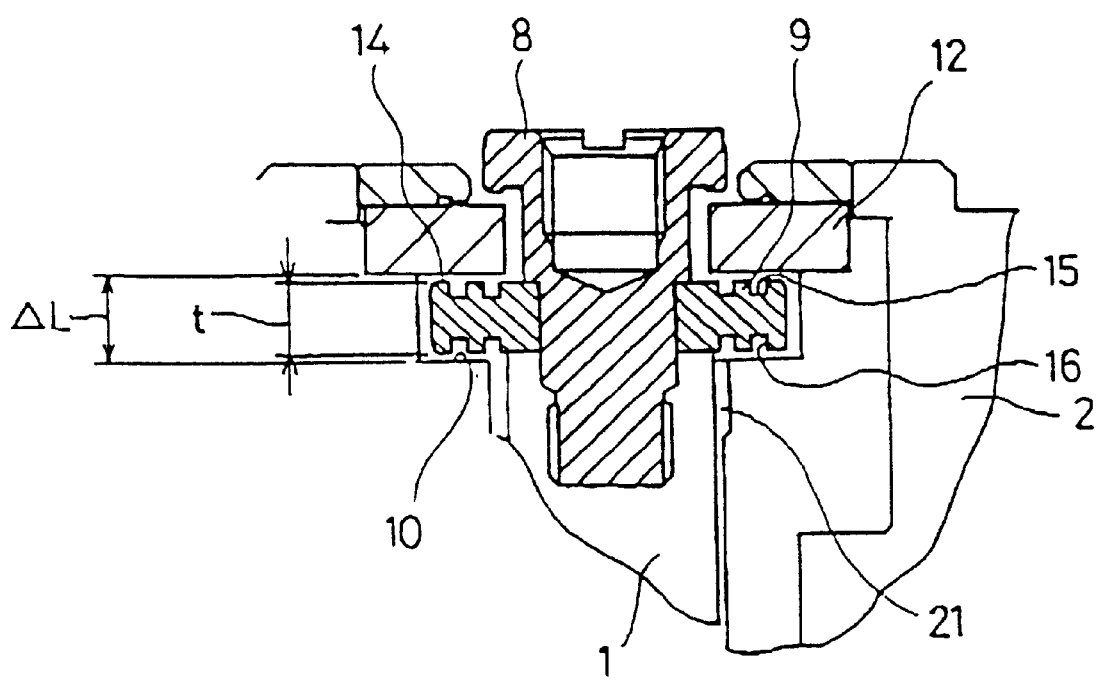
FIG. 2 is an enlarged view illustrating major portions of the hydrodynamic bearing device of the embodiment.

Provided that the stationary thrust plate 9 has a thickness t and the recessed portion 10 has a height ΔL as shown in FIG. 2, a radial spacing Δd of a gap at an open end of the thrust-side dynamic pressure generating portion 14 (see FIG. 3) is set as satisfying the following expression:

$$\Delta d > \Delta L - t$$

A lubricating fluid 21 is filled in the radial-side dynamic pressure generating portion 5 and the thrust-side dynamic pressure generating portion 14. The lubricating fluid to be herein used is composed of not less than 95% of an ester oil with the remaining not greater than 5% being a mineral oil, an olefin, a hydrocarbon or the like. The surface tension of the lubricating fluid is adjusted to 25 dyn/cm (at 29° C.).

In a gap between the rotary sleeve 2 and the stationary shaft 1 on the lower side of the radial-side dynamic pressure generating portion 5 in FIG. 1, the stationary shaft 1 has a tapered portion 1a having a diameter progressively decreasing toward the proximal end thereof, and the rotary sleeve 2 has a larger inner diameter portion 2a provided in association with the tapered portion 1a, the larger inner diameter portion having an inner diameter larger than the inner diameter of a portion of the rotary sleeve 2 facing to the radial-side dynamic pressure generating portion 5. Thus, the lubricating fluid is not allowed into a space defined between the tapered portion 1a of the stationary shaft 1 and the larger inner diameter portion 2a of the rotary sleeve 2 due to the surface tension of the lubricating fluid.

The rotary sleeve 2 is composed of a copper alloy or an aluminum alloy, and a magnetic steel plate 25 is interposed between the rotary sleeve 2 and a magnet 18 for suppression of magnetic leakage.

With this arrangement, upon energization of a stator winding 17, hard disks 4 are rotated at a high speed via the rotary sleeve 2 in a sealed space S defined between the lower casing 3 and an upper casing 19. The rotary sleeve 2 is rotated about the stationary shaft 1, whereby the lubricating fluid is pumped to cause the rotary sleeve 2 to maintain non-contact rotation.

It was confirmed that, where a spacing 26 between an upper face of the stationary thrust plate 9 and a lower face of a rotary thrust ring 12 in the thrust-side dynamic pressure generating portion 14 during rotation is 5 $\mu$m and a spacing between a lower face of the stationary thrust ring 9 and a face of the rotary sleeve 2 opposed thereto is 10 $\mu$m, the optimum performance is ensured. This is expressed as follows:

$$\Delta L = t + 15 \ \mu m$$

For improvement of shock resistance with respect to the thrust direction, it may be preferred that the spacing be smaller. However, it was found that the spacing has a lower limit as expressed by the following expression in consideration of reliability of practical finishing accuracy.

$$\Delta L = t + 10 \ \mu m$$

Further, the spacing has an upper limit as expressed by the following expression in consideration of an allowable range for an intended 500G shock resistance.

$$\Delta L = t + 30 \ \mu m$$

Therefore, the allowable range of the spacing is expressed as follows:

$$\Delta L = t + 10 \ \mu m \text{ to } 30 \ \mu m$$

Figure 4:
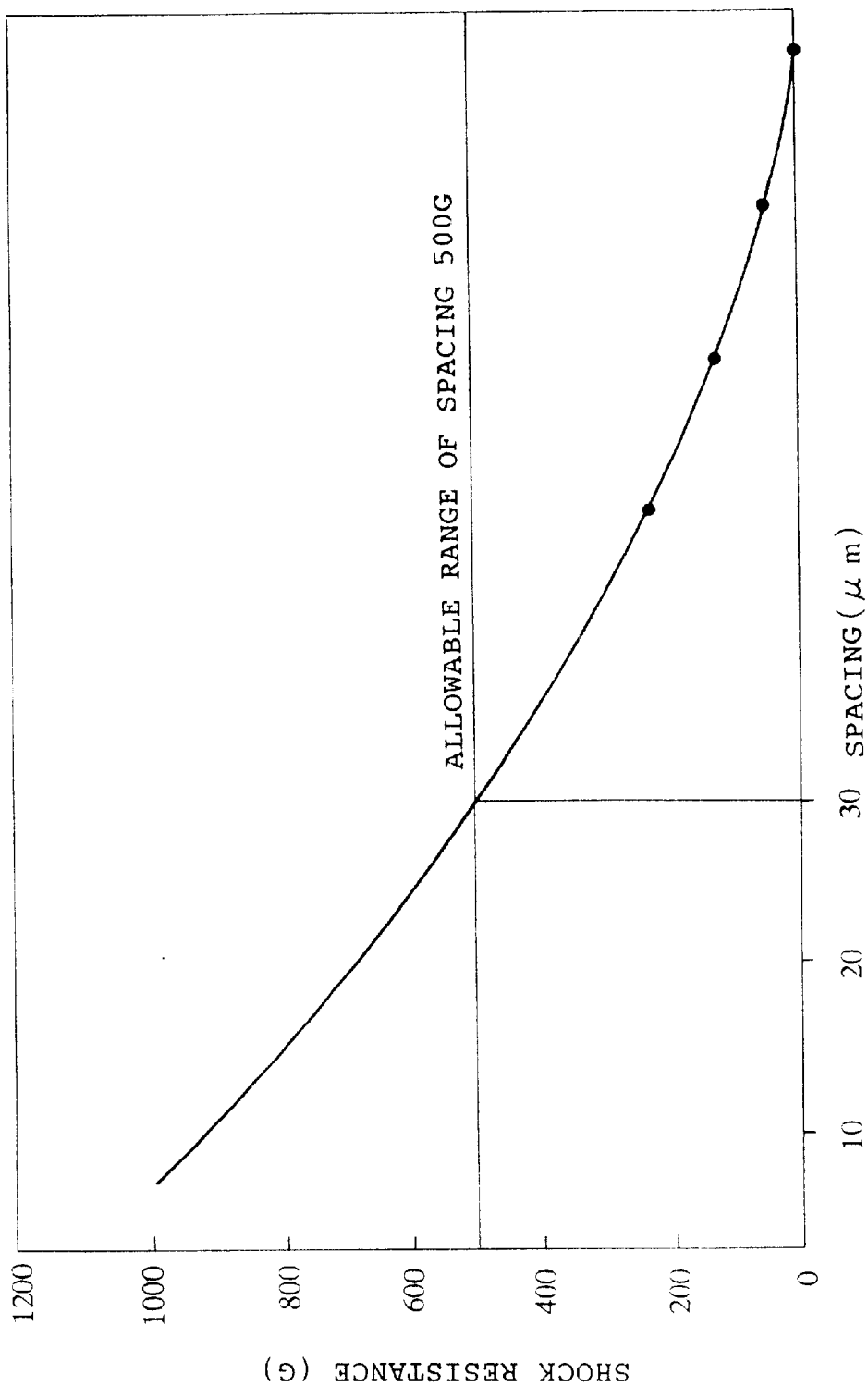
FIG. 4 is a graph showing a relation of a thrust spacing of a gap versus a shock resistance according to the embodiment.

FIG. 4 shows measurement results which indicate the relationship of the spacing versus the shock resistance.

When the intended shock resistance level is lowered in a practically acceptable range without an increase in the finishing accuracy, the allowable range of the spacing is expressed as follows:

$$\Delta L = t + 20 \ \mu m \text{ to } 40 \ \mu m$$

Figure 3:
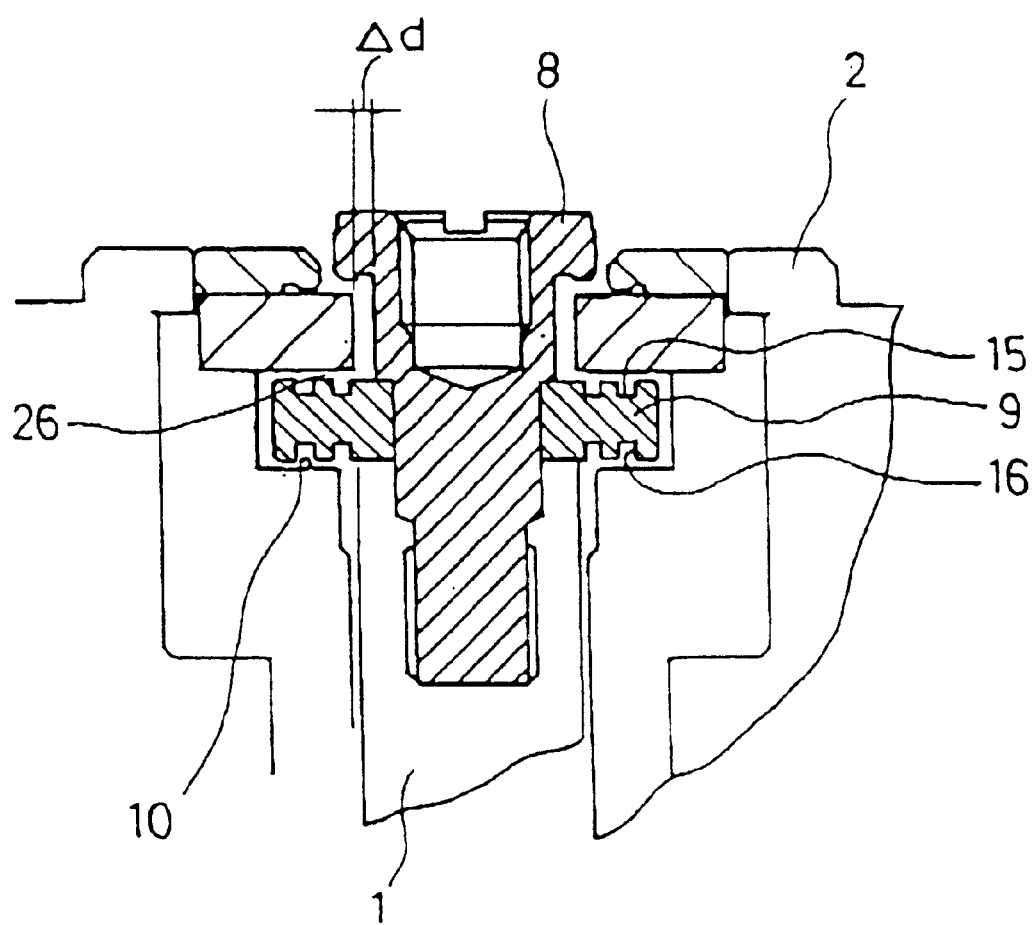
FIG. 3 is an enlarged view illustrating major portions of the hydrodynamic bearing device of the embodiment.

Scattering of the lubricating fluid from the open end of the thrust-side dynamic pressure generating portion to the outside was checked during the operation with the spacing 26 between the upper face of the stationary thrust ring 9 and the lower face of the rotary thrust ring 12 being set to 5 $\mu$m, with the expression $\Delta L = t + 15 \ \mu m$ being satisfied, and with the radial spacing $\Delta d$ of the gap at the open end being set to 30 $\mu$m which prevents the lubricating fluid from flowing into the gap by the surface tension of the lubricating fluid herein used, as shown in FIG. 3. As a result, no fluid scattering was observed. It was found that the allowable range of the radial spacing d is as follows:

$$\Delta d > \Delta L - t$$

As described above, the hydrodynamic bearing device of the present invention is arranged such that: the stationary shaft is provided with the stationary thrust ring; the rotary sleeve has the recessed portion which is defined by the faces thereof opposed to the lower and upper faces and outer circumferential surface of the stationary thrust ring; the lubricating fluid is filled in the gap between the stationary thrust ring and the recessed portion; and the expression $\Delta L = t + 10 \ \mu m$ to $30 \ \mu m$ is satisfied wherein t is the thickness of the stationary thrust ring and $\Delta L$ is the height of the recessed portion. Therefore, the hydrodynamic bearing device has a practically acceptable range of shock resistance with respect to the thrust direction.

Since the hydrodynamic bearing device of the present invention is arranged such that the radial spacing $\Delta d$ of the gap at the open end of the thrust dynamic pressure generating portion is set as satisfying the expression $\Delta d > \Delta L - t$, the scattering of the lubricating fluid can be obviated. Therefore, the hydrodynamic bearing device is particularly suitable for use in a hard disk device.

What is claimed is:

1. A hydrodynamic bearing device, comprising:
    a stationary shaft supported at each end thereof,
    a rotary sleeve rotatably supported about the stationary shaft for pumping a lubricating fluid between the stationary shaft and the rotary sleeve for a non-contact rotation of the device,
    the stationary shaft comprising a stationary thrust ring,
    the rotary sleeve comprising a recessed portion defined by the faces thereof opposed to upper and lower faces and an outer circumferential surface of the stationary thrust ring,
    wherein lubricating fluid filled in a gap defined between the stationary thrust ring and the recessed portion has a surface tension of about 25 dyn/cm at 29° C., and
    the following expression is satisfied:

$$\Delta L = t + 10 \ \mu m \text{ to } 30 \ \mu m$$

wherein t is a thickness of the stationary thrust ring and $\Delta L$ is a height of the recessed portion.

2. The hydrodynamic bearing device according to claim 1, wherein:
    the stationary shaft is supported at its fixed opposite ends,
    a radical-side dynamic pressure generating portion is defined between the stationary shaft and the rotary sleeve and a thrust-side dynamic pressure generating portion is defined between the stationary thrust ring and the recessed portion and disposed on one side of the radical-side dynamic pressure generating portion
    wherein the radical-side dynamic pressure generating portion and the thrust-side dynamic pressure generating portion are filled with the lubricating fluid,
    a radical spacing $\Delta d$ of a gap at an open end of the thrust-side dynamic pressure generating portion satisfies the following expression:

$$\Delta d > \Delta L - t.$$

3. The hydrodynamic bearing-device according to claim 2, wherein:
    the stationary shaft comprises a proximal end fixed to a casing;

the rotary sleeve is rotatably supported about the stationary shaft and comprises an open portion provided adjacent one end thereof in association with a distal end of the stationary shaft, the open portion having a diameter greater than a diameter of the stationary shaft, the rotary sleeve having a outer circumference for attaching a load member thereto;

the stationary thrust ring is generally disk-shaped and comprises a through-hole at its center and attached to the distal end of the stationary shaft, the stationary thrust ring having a lower face opposed to a bottom of the open portion of the rotary sleeve and an outer circumferential surface opposed to an inner circumferential surface of the open portion;

an extension shaft having a proximal end threaded to the distal end of the stationary shaft for thereby fixing the stationary thrust ring to the stationary shaft; and a generally disk-shaped rotary thrust ring provided in the open portion of the rotary sleeve and comprising a center through-hole for extending the extension shaft therethrough;

wherein dynamic pressure generating grooves are provided in a radial-side dynamic pressure generating portion defined by an outer circumferential portion of the stationary shaft and an inner circumferential portion of a center hole in the rotary sleeve, wherein dynamic pressure generating grooves are provided in a thrust-side dynamic pressure generating portion defined by the stationary thrust ring, the inner circumferential surface of the open portion of the rotary sleeve and faces of the rotary sleeve opposed to the stationary thrust ring, the radial-side dynamic pressure generating portion and the thrust-side dynamic pressure generating portion are filled with the lubricating fluid, and a distal end of the extension shaft is fixed to the casing.

4. A motor employing a hydrodynamic bearing device as recited in claim 1.

5. A hydrodynamic bearing device, comprising:

a stationary shaft supported at its fixed opposite ends; and a rotary sleeve rotatably supported about the stationary shaft for pumping a lubricating fluid between the stationary shaft and the rotary sleeve for a non-contact rotation of the device, the stationary shaft comprising a stationary thrust ring, the rotary sleeve comprising a recessed portion defined by the faces thereof opposed to upper and lower faces and an outer circumferential surface of the stationary thrust ring, a radial-side dynamic pressure generating portion being defined between the stationary shaft and the rotary sleeve and a thrust-side dynamic pressure generating portion being defined between the stationary thrust ring and the recessed portion and disposed on one side of the radial-side dynamic pressure generating portion, the radial-side dynamic pressure generating portion and the thrust-side dynamic pressure generating portion being filled with the lubricating fluid, and wherein a radial spacing $\Delta d$ of a gap at an open end of the thrust-side dynamic pressure generating portion satisfies the following expression:

$$\Delta d > \Delta L - t$$

wherein $\Delta d$ is 10 $\mu$m to 30 $\mu$m, t is a thickness of the stationary thrust ring, and $\Delta L$ is a height of the recessed portion and satisfies the following expression:

$$\Delta L = t + 10 \ \mu m \text{ to } 30 \ \mu m.$$

* * * * *